United States Patent [19]
Tsuji et al.

[11] Patent Number: 5,328,548
[45] Date of Patent: Jul. 12, 1994

[54] METHOD OF SYNTHESIZING SINGLE DIAMOND CRYSTALS OF HIGH THERMAL CONDUCTIVITY

[75] Inventors: Kazuwo Tsuji; Takeru Nakashima, both of Hyogo, Japan

[73] Assignee: Sumitomo Electric Industries, Ltd., Osaka, Japan

[21] Appl. No.: 995,935

[22] Filed: Dec. 23, 1992

Related U.S. Application Data

[63] Continuation of Ser. No. 741,655, Aug. 7, 1991, abandoned.

[30] Foreign Application Priority Data

Aug. 9, 1990 [JP] Japan ................... 2-211014

[51] Int. Cl.$^5$ ............................... C30B 29/04
[52] U.S. Cl. ......................... 117/79; 423/446; 117/929
[58] Field of Search ....... 156/603, 610, 613, DIG. 68; 423/446

[56] References Cited

U.S. PATENT DOCUMENTS

| | | | |
|---|---|---|---|
| 3,895,313 | 7/1975 | Seitz | 331/94.5 D |
| 4,547,257 | 10/1985 | Iizuka et al. | 156/603 |
| 4,849,199 | 7/1989 | Pinneo | 156/DIG. 68 |
| 4,927,619 | 5/1990 | Tsuji | 156/DIG. 68 |

FOREIGN PATENT DOCUMENTS 0206820 12/1986 European Pat. Off. .

OTHER PUBLICATIONS

R. Berman et al., "The thermal conductivity of diamonds", Diamond Research, 1976, pp. 7-13.

"Vapor Growth Diamond on Diamond and Other Surfaces"; Spitsyn et al.; Journal of Crystal Growth 52 (1981) pp. 219-226.

*Primary Examiner*—R. Bruce Breneman
*Assistant Examiner*—Felisa Garrett
*Attorney, Agent, or Firm*—Cushman, Darby & Cushman

[57] ABSTRACT

A method of synthesizing single diamond crystals using a carbon source containing at least 99.9 atomic % carbon-12. This is accomplished by graphitizing carbon-12 to form a highly crystalline material which can be used as a carbon source in an ultra high pressure creating apparatus to produce single diamond crystals by means of a temperature difference process.

5 Claims, 2 Drawing Sheets

METHOD OF SYNTHESIZING SINGLE DIAMOND CRYSTALS OF HIGH THERMAL CONDUCTIVITY

This is a continuation of application Ser. No. 07/741,655, filed on Aug. 7, 1991, which was abandoned upon the filing hereof.

BACKGROUND OF THE INVENTION

1. Field of the Invention

The invention relates to a method of synthesizing single diamond crystals of high thermal conductivity and having at least 99.9 atomic % carbon-12. The method involves graphitizing amorphous carbon of at least 99.9 atomic % carbon-12 to form a highly crystalline carbon which can then be submitted to high temperature and pressure in a temperature difference process to form synthetic single diamond crystals.

2. Description of Related Art

Diamond has the highest thermal conductivity of all known materials and because of this property, diamond is commonly used as a heat sink in high power lasers or as a window material in $CO_2$ lasers, both of which require good heat conduction.

However, carbon which is the constituent element of diamond inherently contains approximately 1.1 atomic % of an isotope with mass number 13, so the thermal conductivity of naturally occurring diamond is lower than that of the ideal one which is solely composed of carbon atoms having mass number 12 exhibiting a value of only approximately 20 W/cm·K at room temperature. If a perfect diamond composed solely of carbon atoms having mass number 12 were produced, it is supposed that it would exhibit a thermal conductivity of at least 50 W/cm·K. (See Diamond Research pages 7-13 (1976)).

It is known that diamond can be synthesized by subjecting a carbon source and a metal solvent to ultra high pressure and high temperature conditions wherein diamond is thermodynamically stable. A temperature difference process is a synthesis method of choice that can produce large and excellent diamond crystals.

The general layout of a sample cell used in the practice of this method is shown in FIG. 4. The sample cell in an ultra high pressure apparatus contains a carbon source 1 and a diamond seed crystal 2 between which a metal solvent 3 such as Fe, Ni or Co is held. While an ultra high pressure is exerted via a pressure medium 5, a heater 4 is activated to create a temperature difference of several tens of degrees in Celsius between a hotter portion of the carbon source 1 and a cooler portion of the seed crystal 2. The carbon dissolved in the metal solvent 3 is transported to the cooler portion and subjected to pressure and temperature conditions where diamond is thermodynamically stable. By this means, single diamond crystals are grown on the seed crystal 2 supported on a seed bed 6.

In order to insure that single diamond crystals of high thermal conductivity that are solely composed of carbon atoms with mass number 12 can be synthesized by the temperature difference process and other methods of diamond synthesis, carbon with mass number 12 must be used as a carbon source.

Carbon with mass number 12 is conventionally produced by a process that comprises separating the desired carbon from carbon monoxide or methane gas by mass separation and then carbonizing the separated carbon. The purity of the product is approximately 99.9-99.99 atomic %. However, the carbon with mass number 12 that is obtained by this process is amorphous with low crystallinity and consists of fine grains.

Attempts have already been made to synthesize a diamond of high thermal conductivity using as a carbon source said amorphous carbon containing at least 99.9 atomic % of carbon having a mass number 12. However, the crystals grown by using amorphous carbon contain more metal inclusions and irregular shape crystals than crystals grown from natural and artificial graphites that have higher degrees of crystallinity at the same grain size. Thus, it is difficult to obtain satisfactory crystals with the amorphous carbon. A probable explanation for this phenomenon would be that the low crystallinity of the carbon source affects the rate of its dissolution into the metal solvent and makes it impossible for the carbon to be transported at an appropriate speed. Another problem with the amorphous carbon is that it easily adsorbs various impurity gases that will contaminate the atmosphere of diamond synthesis.

A compacted carbon disk or compact is conventionally used as the carbon source but the particles of the amorphous carbon containing at least 99.9 atomic % of carbon with mass number 12 are so small that the density of the compact can only be increased to approximately 1.1 g/cm³ which is about one half the density of the compact of a natural graphite powder (2.0 g/cm³). As a consequence, the compact placed under ultra high pressure diamond synthesis conditions has a smaller thickness than that of a compact made from ordinary graphite powder. This causes smaller thickness variations in the temperature profile not only in the direction in which carbon is dissolved but also in its transport direction. These variations in the temperature profile make it impossible to achieve an appropriate speed of carbon transport and, hence, satisfactory diamond crystals (as were achieved in the case described above) cannot be obtained. Further, this low density compact requires an excessively large applied load in order to generate pressure of at least 55 Kb necessary to produce a stable diamond. This shortens the life of synthesis equipment and increases the cost of diamond production.

SUMMARY OF THE INVENTION

This method involves graphitizing amorphous carbon containing at least 99.9 atomic % of carbon with mass number 12 at a minimum of 1800° C. in an inert gas atmosphere and submitting the thus obtained highly crystalline carbon to high pressure and temperature in a temperature difference process to process synthetic single diamond crystals.

According to the present invention, excellent single diamond crystals can be synthesized using a carbon source containing at least 99.9 atomic % of carbon with mass number 12. These diamond crystals have a thermal conductivity at least 1.5 times higher than those of conventional synthetic single diamond crystals and are made up of substantially nitrogen-free, natural type IIa diamond.

Hence, the single diamond crystals of high thermal conductivity that are produced by the method of the present invention can advantageously be used as heat sink materials in high-power lasers or as window materials in $CO_2$ lasers. Because of their exceptionally high thermal conductivity, those single diamond crystals not only have a longer service life but also contribute to a marked improvement in the overall reliablity of equipment such as laser apparatus. The present invention has been achieved under the above conditions and provides a method of diamond synthesis that uses a carbon source containing at least 99.9 atomic % of carbon with mass number 12 and which is capable of producing excellent single diamond crystals that have a higher thermal conductivity than the conventional synthetic single diamond crystals and that are free from metal inclusions and irregular shape crystals.

This object of the present invention can be attained by a method of synthesizing single diamond crystals using a carbon source containing at least 99.9 atomic % of carbon with mass number 12 in the presence of a metal solvent under temperature and pressure conditions in which diamond is thermodynamically stable. This method involves graphitizing amorphous carbon containing at least 99.9 atomic % of carbon with mass number 12 at a minimum of 1800° C. in an inert gas atmosphere and using the thus obtained highly crystalline carbon as the carbon source.

DETAILED DESCRIPTION OF THE INVENTION

It is generally known that graphitization is effective for enhancing the crystallinity of carbon. However, the appropriate processing temperature usually varies with a specific carbon material. Nothing has been previously known about the temperature at which amorphous carbon that contains at least 99.9 atomic % of carbon with mass number 12 can be crystallized, especially to an extent that is effective for diamond synthesis.

The present inventors therefore conducted experiments in which amorphous carbon, containing at least 99.9 atomic % of carbon with mass number 12 and obtained by carbonization following separation by mass analysis of carbon from carbon monoxide or methane gas, was graphitized at various temperatures. Diamonds were synthesized using the resulting carbon sources which had varying high degrees of crystallinity. As a result, it was found that excellent single diamond crystals having high thermal conductivity could be synthesized using as a carbon source the highly crystalline carbon that was obtained by graphitization at temperatures of 1800° C. and above.

Figure 1:
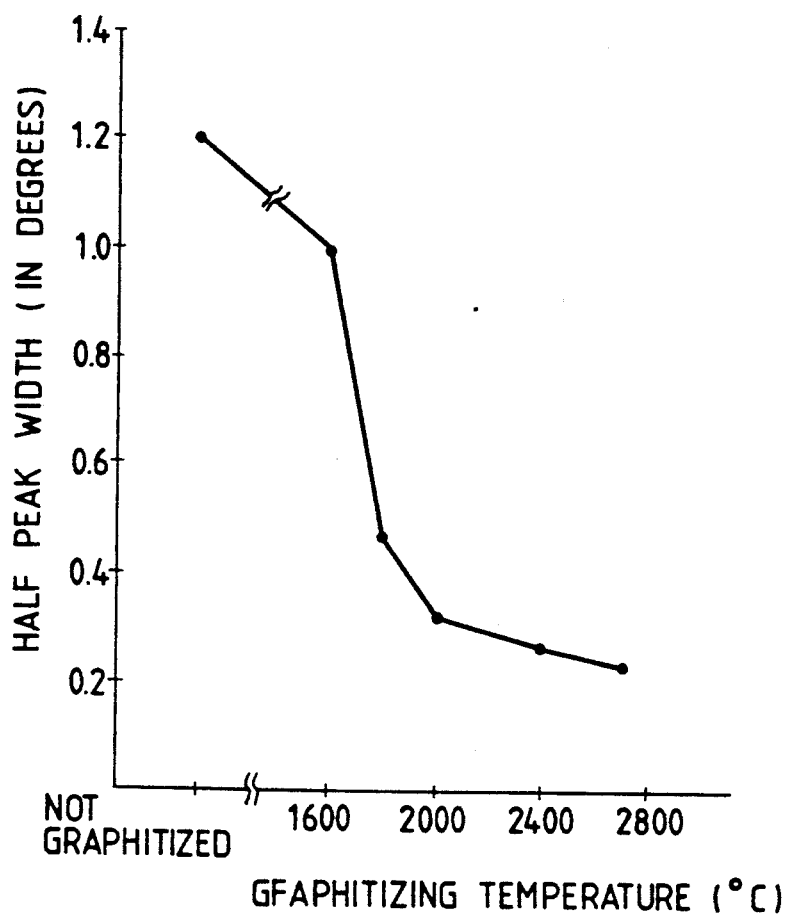
FIG. 1 is a graph showing the relationship between the temperature for graphitizing amorphous carbon containing at least 99.9 atomic % of carbon with mass number 12 and the half-peak width of a (002) diffraction line in X-ray diffraction that represents the crystallinity of the resulting highly crystalline carbon.

The present inventors also checked the relationship between the temperature for graphitization and the degree of crystallinity of highly crystalline carbon as expressed by the half-peak width of a (002) diffraction line in its X-ray diffraction pattern. The result is shown in FIG. 1, from which one can see that the degree of crystallinity increased with the increasing graphitization temperature and that at 1800° C. and above, the half-peak width of a (002) diffraction line in the X-ray diffraction pattern was 0.5 degrees and smaller. For X-ray diffraction, Cu was used as an anode material and a $K_\alpha$ line at an acceleration voltage of 40 kV was used. The (002) diffraction line is the diffraction line of X-rays that diffracted from a (002) face of a graphite crystal in accordance with Bragg's law.

Figure 2:
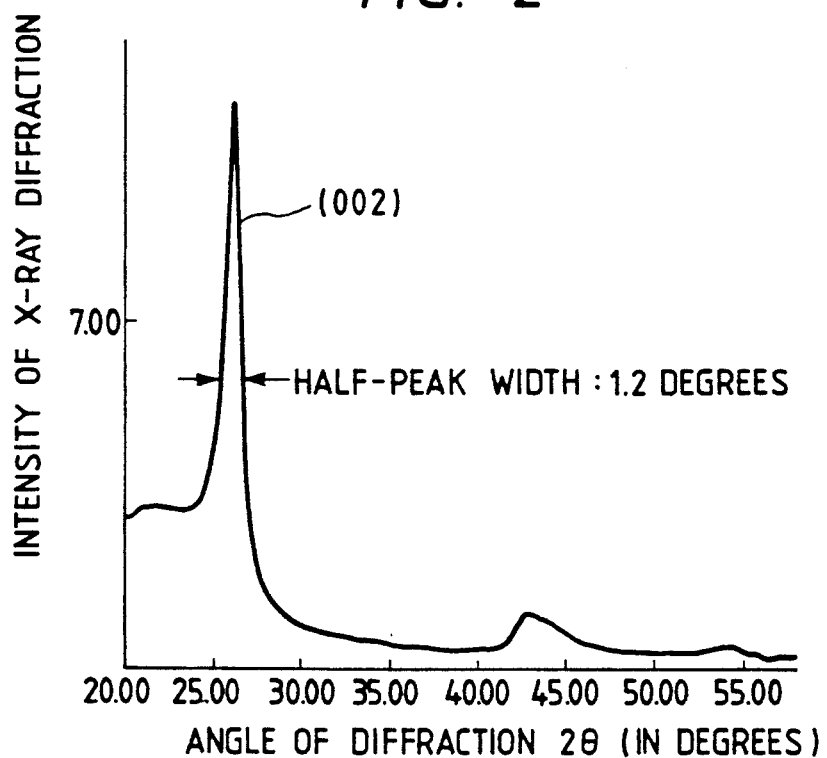
FIG. 2 is an X-ray diffraction pattern of an amorphous carbon powder containing at least 99.9 atomic % of carbon with mass number 12.
Figure 3:
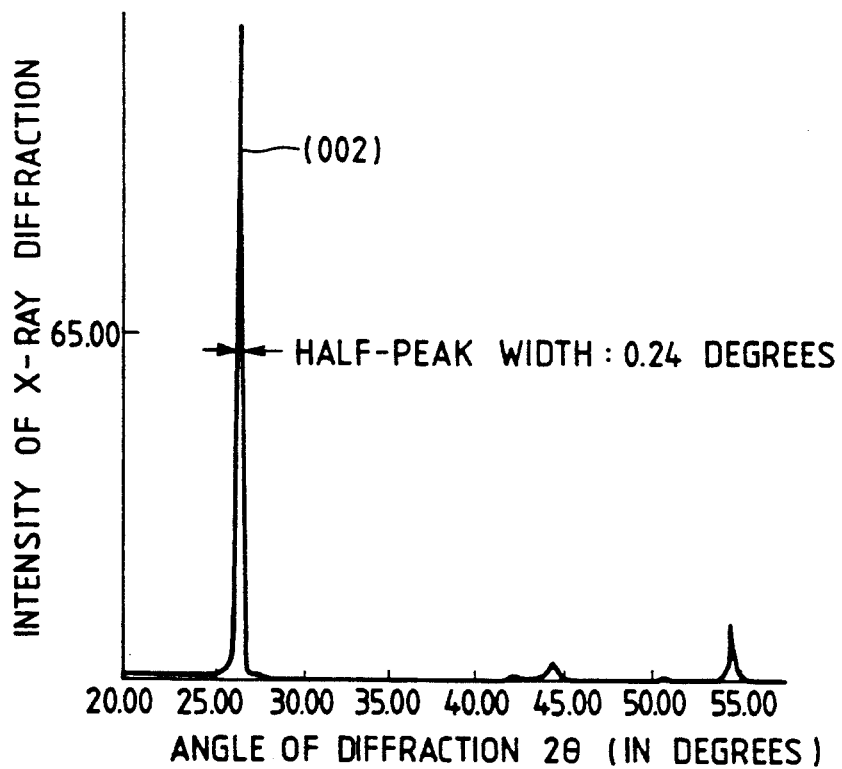
FIG. 3 is an X-ray diffraction pattern of the highly crystalline carbon obtained by graphitizing said amorphous carbon powder at 2700° C.

FIG. 2 shows an X-ray diffraction pattern of the ordinary amorphous carbon powder containing at least 99.9 atomic % of carbon with mass number 12 that was subjected to X-ray diffraction under the conditions specified above. The half-peak width of a (002) diffraction line is 1.2 degrees, indicating the very low crystallinity of the graphite. When this amorphous carbon powder was graphitized in an argon atmosphere at 2700° C. for 2 hours, a carbon powder was obtained which, as shown in FIG. 3, had the half-peak width of a (002) diffraction line lowered to 0.24 degrees, thus achieving a substantial improvement in crystallinity. In the graphitization, the pressure of argon gas is normally an atmospheric pressure. A nitrogen gas may be used instead of the argon gas. However, the argon gas is most preferable. A minimum time of the graphitization depends on the temperature and becomes short as the temperature becomes high. The minimum time is about 30 minutes.

Figure 4:
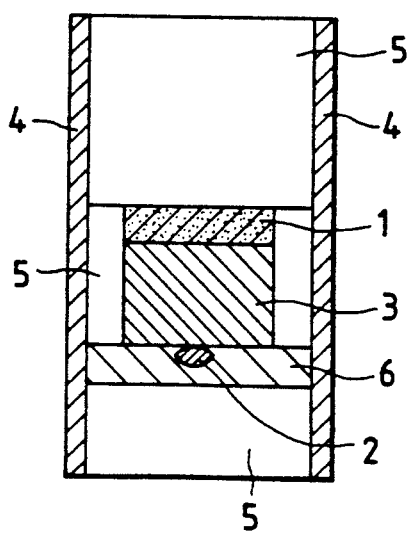
FIG. 4 is a schematic cross-sectional view showing the general layout of a sample cell used in diamond synthesis by a temperature difference process.

FIG. 4 shows a schematic cross-sectional view showing the general layout of a sample cell used in diamond synthesis by a temperature difference process. Specific parts in FIG. 4 are designated as follows:

1: the carbon source;
2: the seed crystal;
3: the metal solvent;
4: the heater;
5: the pressure medium; and
6: the seed bed.

Thus, a highly crystalline carbon of at least 99.9 atomic carbon with mass number 12 can be obtained by performing graphitization in the manner described above. The carbon obtained has good graphite crystallinity and desorbs only a small amount of impurity gases when compared with graphitization in the conventional manner of carbon of at least 99.9 atomic % carbon with mass number 12.

As a further advantage, this carbon can be compacted to a higher density than the conventional amorphous carbon powder. Therefore, by using this highly crystalline carbon as a carbon source, the appropriate rates of carbon dissolution and transport can be achieved under diamond synthesis conditions. Furthermore, single diamond crystals having high thermal conductivity can be synthesized that are of good quality and are free of metal inclusions and irregular shape crystals. These single diamond crystals contain at least 99.9 percent carbon with mass number 12. The density of a compacted carbon is preferably about 1.2–2.2 g/cm$^3$.

Single diamond crystals obtained by the conventional methods of synthesis usually contain 10–100 ppm of nitrogen as an impurity. Although this impurity nitrogen is similar to carbon with mass number 13 in that it lowers the thermal conductivity of diamond, the effect of nitrogen is small since its content is lower than that of $^{13}C$ by orders of magnitude. Nevertheless, a further improvement in thermal conductivity can be achieved if the nitrogen impurity is completely eliminated. To this end, an ordinary metal solvent such as Fe, Ni or Co is added with 1–5 wt % of Al, Zr or Ti that act as nitrogen collectors and the resulting Fe-4Al, Fe-30Ni-2Al, etc. may be used to reduce the nitrogen content to 1 ppm and below.

EXAMPLES

EXAMPLE 1

An amorphous carbon powder (product of ISOTEC Inc.) containing 99.9 atomic % of carbon with mass number 12 ($^{12}C$) was graphitized in an Ar gas atmosphere at 2400° C. for 2 hours to prepare a highly crystalline carbon powder.

The crystallinity of this powder was 0.28 degrees as expressed by the half-peak width of a (002) diffraction line in its pattern of X-ray diffraction conducted using Cu as an anode material and having a $K_\alpha$ line at an acceleration voltage of 40 kV. This highly crystalline carbon powder was pressed at 5 tons/cm$^2$ into a disk-shaped compact that measured 7 mm in diameter and 3 mm in thickness and that had a density of 1.6 g/cm$^3$.

The compact was used as a carbon source 1 in the sample cell in an ultra high pressure creating apparatus as shown in FIG. 4. Placed below and in contact with the carbon source 1 was a metal solvent 3 that was made of an Fe-42Ni alloy measuring 7 mm in diameter and 5 mm in thickness. Placed below and in contact with the metal solvent 3 was a diamond seed crystal 2 with a size of 500 μm that was buried in a seed bed 6 of NaCl measuring 7 mm in diameter and 2 mm in thickness. The resulting sample was held for 50 hours under a pressure of 52 Kb and a temperature of 1400° C. (generating a temperature difference of approximately 50° C. between the carbon source 1 and the seed crystal 2). The load necessary to generate the pressure of 52 Kb was 450 tons. After the temperature and pressure were reduced to the ambient level, the sample was recovered and diamond was extracted by dissolving away the metal solvent with aqua regia. (In general, the pressure applied to the sample is at least such a value as to be determined by an equilibrium line of diamond and graphite, the temperature applied to the sample is at least such a value as to be determined by a melting point of a solvent used, and the sample is held for about 10–15 hours for 0.66 carats size, about 50–100 hours for 1–2 carats size, and about 100–200 hours for 10 carats size.)

The extracted diamond weighed 0.66 carats and comprised a yellow single crystal that was free from metal inclusions and irregular shape crystals and that contained approximately 60 ppm of nitrogen. This single diamond crystal was cut to a rectangular parallelopiped (2×2×3 mm) and its thermal conductivity was found to be 28 W/cm·K when measured by a method that comprised measuring the temperature gradient of the sample under a steady heat flux condition and comparing it with the reference gradient. The measured thermal conductivity was 1.4 times as high as the value of the conventional single diamond crystal containing 1.1 atomic % of carbon with mass number 13 ($^{13}C$).

EXAMPLE 2

An amorphous carbon powder containing 99.9 atomic % of $^{12}C$ was graphitized as in Example 1 except that the processing temperature was 1800° C. The crystallinity of the resulting highly crystalline carbon powder was 0.47 degrees as expressed by the half-peak width of a (002) diffraction line in its pattern of X-ray diffraction conducted under the same conditions as in Example 1. This highly crystalline carbon powder was compacted and subjected to diamond synthesis as in Example 1. The compact had a density of 1.4 g/cm$^2$. The load necessary to generate a synthesis pressure of 52 Kb was 470 tons.

The synthesized diamond weighed 0.53 carat and comprised a satisfactory yellow single crystal although it contained a small amount of metal inclusions.

COMPARATIVE EXAMPLE

Diamond synthesis was attempted as in Example 1 using two carbon powders: one was the same amorphous carbon powder as used in Example 1 which contained 99.9 atomic % of $^{12}C$, and the other was a highly crystalline carbon powder that was obtained by graphitizing said amorphous carbon powder as in Example 1 except that the processing temperature was 1600° C.

The first-mentioned carbon powder had a half-peak width of 1.2 degrees for a (002) diffraction line in its pattern of X-ray diffraction conducted under the same conditions as in Example 1, whereas the second-mentioned carbon powder had a half-peak width of 1.0 degree for the same diffraction line. The compact of the first carbon powder had a density of 1.1 g/cm$^3$ whereas that of the second carbon powder had a density of 1.2 g/cm$^3$.

An attempt was made to synthesize diamond using the compact of the first carbon powder at a temperature of 1300° C. under a load of 500 tons but the pressure generated was lower than 52 Kb and no diamond was obtained but only graphite formed around the seed crystal. When the compact of the second carbon powder was subjected to diamond synthesis at a temperature of 1300° C. under a load of 500 tons, three irregular shape crystals formed on the seed crystal but no satisfactory single diamond crystal could be obtained.

EXAMPLE 3

An amorphous carbon powder containing 99.9 atomic % of $^{12}C$ was graphitized as in Example 1 except that the processing temperature was 2700° C. The crystallinity of the resulting highly crystalline carbon powder was 0.24 degrees as expressed by the half-peak width of a (002) diffraction line in its pattern of X-ray diffraction conducted under the same conditions as in Example 1. This highly crystalline carbon powder was compacted as in Example 1 and the resulting compact had a density of 1.65 g/cm$^3$ with Fe-4Al used as a metal solvent. This compact was exposed to a temperature of 1450° C. for 60 hours under a pressure of 53 Kb that was generated by exerting a load of 450 tons.

The thus synthesized diamond weighed 0.72 carat and comprised a satisfactory colorless and clear single crystal that was entirely free from metal inclusions and substantially free of nitrogen impurity. This single crystal was cut to a rectangular parallelopiped (2.5×2.5×3 mm) and its thermal conductivity was measured by the same method as used in Example 1. The diamond synthesized in Example 3 exhibited a thermal conductivity of 32 W/cm·K which was even higher than that of the nitrogen-containing product obtained in Example 1.

What is claimed is:

1. A method of synthesizing single diamond crystals comprising the steps of:
    a) separating carbon containing 99.9 atomic % C-12 from at least one of carbon monoxide and methane;
    b) making amorphous carbon of at least 99.9 atomic % C-12 from the separated carbon of step a);

c) graphitizing said amorphous carbon of at least 99.9 atomic % carbon-12 in an inert gas atmosphere, at a temperature of at least 1800° C. to form a crystalline carbon;

d) pressing said crystalline carbon to form a carbon compact with a density of from 1.2 to 2.2 g/cm$^3$;

e) placing said compact in an ultra high pressure apparatus with a diamond seed crystal and a metal solvent, wherein said metal solvent is comprised of 1 to 5 wt % of Al, Zr or Ti and is positioned between said compact and said seed crystal; and f) exerting ultra high pressure on said compact solvent and seed crystal while generating a temperature difference between an area of said compact and an area of said seed crystal, whereby carbon from said compact dissolves into said metal solvent and moves to said seed crystal to form at least one single diamond crystal on said seed crystal, wherein, said single diamond crystal has a thermal conductivity of at least 28.0 W/cm·K.

2. A method according to claim 1 wherein the crystalline carbon has no more than 0.5 degrees half-peak width of a (002) diffraction line in an X-ray diffraction pattern of said carbon.

3. A method according to claim 1 wherein the metal solvent is selected from the group comprised of Fe, Ni or Co.

4. A method according to claim 1 wherein said single diamond crystal forming step comprises:

placing said compact in an ultra high pressure apparatus with a diamond seed crystal and a metal solvent, wherein said metal solvent is positioned between said compact and said seed crystal;

exerting ultra high pressure on said compact, solvent, and seed crystal while generating a temperature difference between an area of said compact and an area of said seed crystal, wherein carbon from said compact dissolves into said metal solvent and moves to said seed crystal to form at least one single diamond crystal on said seed crystal.

5. A method of increasing thermal conductivity in a single diamond crystal comprising the steps of:

a) forming non diamond crystalline carbon including at least 99.9 atomic % carbon-12 by graphitizing amorphous carbon of at least 99.9 atomic % carbon-12 in an inert gas atmosphere and at a temperature of at least 1800° C.; and b) subjecting said non diamond crystalline carbon and a metal solvent to pressure and temperature conditions in which diamond is thermodynamically stable to form a single diamond crystal having a thermal conductivity of at least 28.0 W/cm·K.

* * * * *